US012480761B2

(12) United States Patent
Harootunian et al.

(10) Patent No.: US 12,480,761 B2
(45) Date of Patent: Nov. 25, 2025

(54) HIGH TEMPERATURE AUTO TEACH CALIBRATION DISC

(71) Applicant: Applied Materials, Inc., Santa Clara, CA (US)

(72) Inventors: Dylan Arius Harootunian, Burlingame, CA (US); Damon K. Cox, Jarrell, TX (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 18/521,271

(22) Filed: Nov. 28, 2023

(65) Prior Publication Data

US 2025/0172391 A1    May 29, 2025

(51) Int. Cl.
    *G01B 21/04*   (2006.01)
(52) U.S. Cl.
    CPC ................... *G01B 21/042* (2013.01)
(58) Field of Classification Search
    CPC ..................... G01B 21/042; G01B 21/045
    USPC ....... 73/1.79, 1.81, 1.86; 702/87, 90, 91, 94, 702/95, 254; 901/3, 46, 47
    See application file for complete search history.

(56) References Cited

U.S. PATENT DOCUMENTS

| 6,463,782 | B1 * | 10/2002 | Shen ....................... H01L 21/68 73/1.79 |
| 11,127,614 | B2 | 9/2021 | Kawabe |

| 2016/0336212 | A1 | 11/2016 | Johnson et al. |
| 2022/0126454 | A1 | 4/2022 | Martin et al. |
| 2023/0016016 | A1 | 1/2023 | Finkelman et al. |
| 2023/0364794 | A1 | 11/2023 | Bergantz et al. |

FOREIGN PATENT DOCUMENTS

CN    219626624 U   *   9/2023

OTHER PUBLICATIONS

International Search Report and Written Opinion for International Application No. PCT/US2024/052250, mailed Feb. 5, 2025, 11 Pages.

* cited by examiner

*Primary Examiner* — Robert R Raevis
(74) *Attorney, Agent, or Firm* — Lowenstein Sandler LLP

(57) ABSTRACT

A calibration disc is inserted into a processing chamber using a robot arm. A first position of a center of the calibration disc is determined using one or more sensors positioned at a port of the processing chamber. The calibration disc is placed onto a substrate support within the processing chamber and features of the calibration disc cause the calibration disc to become centered on the substrate support. The calibration disc is removed from the substrate support and the processing chamber by the robot arm. A second position of the center of the calibration disc is determined using one or more sensors as the calibration is removed from the processing chamber. A difference is determined between the first and second position of the center of the calibration disc. An offset is determined to apply to the robot arm when placing wafers onto the substrate support based on the difference.

19 Claims, 8 Drawing Sheets

HIGH TEMPERATURE AUTO TEACH CALIBRATION DISC

TECHNICAL FIELD

Embodiments of the present disclosure relate, in general, to methods and systems for calibrating components of an electronics processing system, and in particular to calibrating transfer sequences between components of an electronics processing system.

BACKGROUND

Calibration and teaching processes for stations in an electronics processing system currently occur at room temperature. This results in a large difference between the temperature of calibration process and the operation temperature at the station or processing chamber. The elevated process temperature results in thermal expansion of components of the station or processing chamber, introducing error into the calibration values. At operating temperatures over 400 degrees C., some chamber components, made out of aluminum for example, could expand over 3 mm due to thermal expansion. This results in cold temperature teaching or calibrating methods having reduced accuracy.

Current automated calibration and teaching solutions use components that include batteries that can't be exposed to operating temperature environments, as the batteries include the risk of expanding or exploding at operating temperatures. This increases the risk of contamination in a station or processing chamber with chemicals from battery components. Current strategies also suffer from expensive materials for both calibration objects and sensors.

An electronics processing system may include one or more robot arms for transporting a calibration disc from one substrate support of the electronics processing system to another substrate support of the electronics processing system. In electronics processing systems, a substrate or an object is to be moved from one substrate support to another, to a center location of each substrate support. Frequently, one or more system errors or erroneous calibration associated with the first substrate support, the second substrate support and/or one or more robot arms may prevent a robot arm from placing the substrate or the object at a target orientation and position at the second substrate support.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

In one aspect of the disclosure, a method includes inserting a calibration disc into a processing a chamber using a robot arm. The method further includes determining a first position of a center of the calibration disc using one or more sensors positioned at a port of the processing chamber as the calibration disc is inserted into the processing chamber. The method further includes placing the calibration disc onto a substrate support within the processing chamber. One or more features of the calibration disc cause the calibration disc to become centered on the substrate support. The method further includes removing the calibration disc from the substrate support and form the processing chamber using the robot arm. The method further includes determining a second position of the center of the calibration disc using the one or more sensors as the calibration disc is removed from the processing chamber. The method further includes determining a difference between the first position of the center of the calibration disc and the second position of the center of the calibration disc. The method further includes determining an offset to apply to the robot arm when placing wafers onto the substrate support based on the determined difference.

In one aspect of the disclosure, a method includes retrieving, by a robot arm within a processing chamber, a calibration disc from a first substrate support within the processing chamber. The method further includes transferring the calibration disc to a second substrate support within the processing chamber using the robot arm. The method further includes determining a first position of a center of the calibration disc using one or more sensors positioned between the first substrate support and the second substrate support as the calibration disc is transferred between the first substrate side and the second substrate support. The method further includes placing the calibration disc onto the second substrate support. One or more features of the calibration disc cause the calibration disc to become centered on the second substrate support. The method further includes retrieving, by a robot arm, the calibration disc from the second substrate support. The method further includes transferring the calibration disc to the first substrate support or to a third substrate support within the processing chamber using the robot arm. The method further includes determining a second position of the center of the calibration disc using the one or more sensors or one or more additional sensors positioned between the second substrate support and the third substrate support. The method further includes determining a difference between the first position of the center of the calibration disc and the second position of the center of the calibration disc. The method further includes determining an offset to apply to the robot arm when placing wafers onto the second substrate support based on the determined difference.

In one aspect of the disclosure, a calibration disc includes a disc-shaped body sized to fit through a slit valve of a processing chamber. The calibration disc further includes at least three arms extending approximately radially from the disc-shaped body, each arm of the at least three arms comprising a chamfered edge configured to engage with an edge of a substrate support of the processing chamber and to guide the calibration disc to a first target position at the substrate support. The calibration disc further includes a second chamfered edge configured to engage with an edge of a pocket of the substrate support and to guide the calibration disc from the first target position to a second target position at the substrate support at which the calibration disc is centered on the substrate support.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one.

DETAILED DESCRIPTION OF EMBODIMENTS

Figure 1:
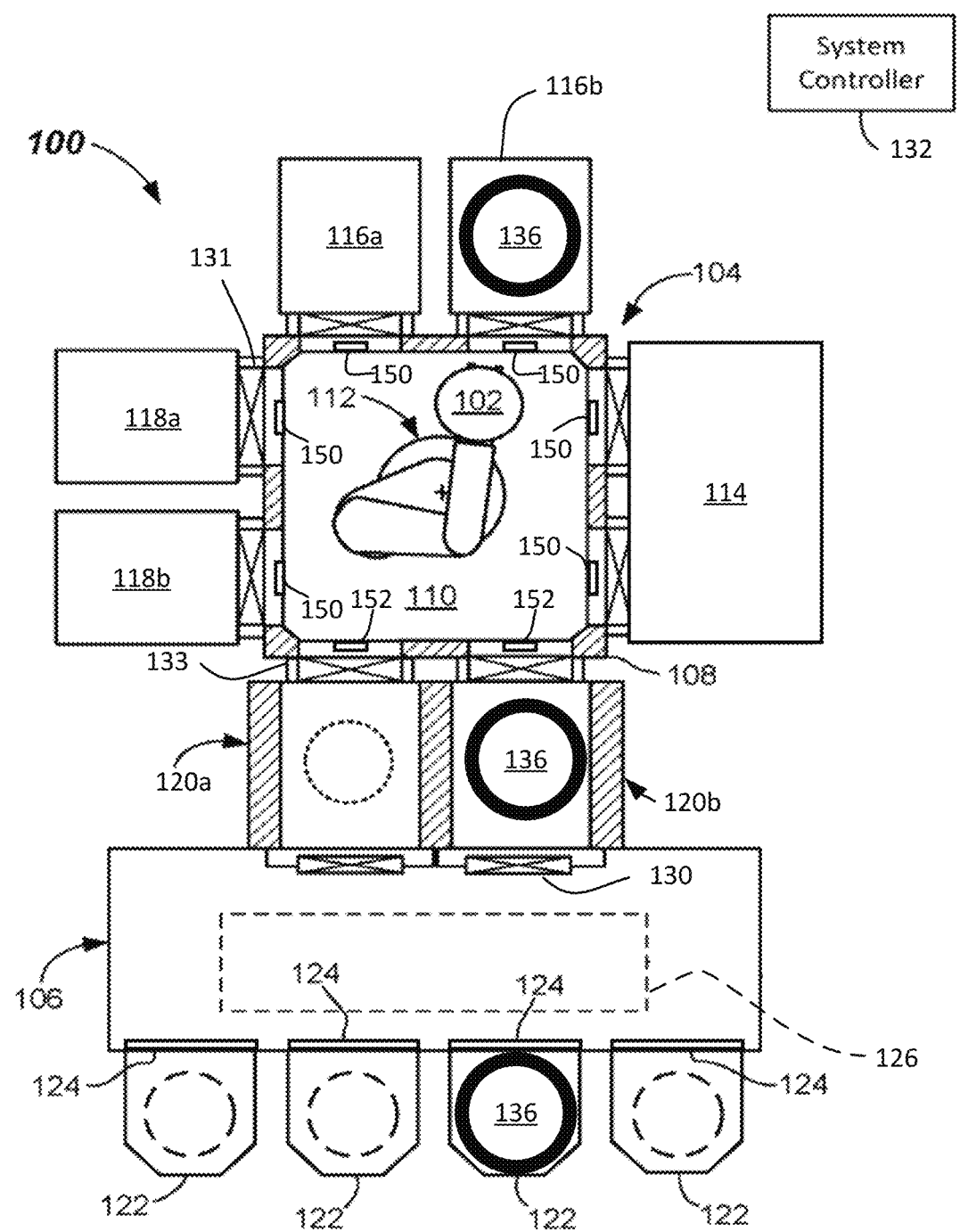
FIG. 1 is a top schematic view of an example electronic processing system, according to aspects of the present disclosure.

Calibration and teaching processes for stations in an electronics processing system that occur at room temperature result in large differences between the temperature of the calibration process and the operation temperature at the station. The elevated process temperature results in thermal expansion of components of the station, introducing error into the calibration values. This results in cold temperature teaching or calibrating methods having less accurate than positions taught at operating temperature.

Methods of calibration and teaching that occur at operating temperatures are more accurate than cold temperature (e.g., room temperature) calibration methods. However, sensors commonly implemented in these methods use batteries that cannot be exposed to high temperatures such as the operating temperature ranges, which leads to calibration being performed at room temperature. As set forth in embodiments herein, methods that take advantage of the thermal expansion of processing chamber components at operating temperatures to use physical features of calibration devices to become centered on substrate supports allow for high temperature calibration and position teaching without the use of sensors that are sensitive to high temperatures.

Embodiments of the present disclosure relate to methods and a calibration disc for calibrating one or more components of an electronics processing system at elevated temperatures. In embodiments, multiple components of the electronics processing system are calibrated at operating temperatures such that cumulative error or placement error by or at any of the multiple components is eliminated or reduced. In embodiments described herein, a calibration disc is centered on a substrate support at operating temperature using physical features (e.g., kinematic coupling features) of the calibration disc. The physical features of the calibration disc cause the disc to become centered on the substrate support. Such centering is performed at operating temperatures, and therefore is performed while the components of a substrate support are expanded due to thermal expansion that occurs at the operating temperatures. This results in improved calibration accuracy.

In some embodiments, a method includes inserting a calibration disc into a processing chamber at operating temperature using a robot. Sensors placed outside of the processing chamber (e.g., at a load port connected to the processing chamber) determine a first center position of the calibration disc as it is inserted into the chamber. In embodiments, the calibration disc is placed on the substrate support. Features of the calibration disc cause the calibration disc to become centered on the substrate support at operating temperature. The robot that placed the calibration disc onto the substrate support may pick up the now centered calibration disc, and remove the calibration disc from the processing chamber. The sensors placed outside of the processing chamber may again determine a second center position of the substrate while the substrate is removed from the processing chamber. A difference may be determined between the first center position and the second center position. The Difference may then be used to determine an offset to apply to the robot when placing substrates at the substrate support to cause those substrates to be centered on the substrate support. This allows for centering of the calibration disc without exposing sensors of electronic sensor discs to the high operating temperatures inside of the processing chamber.

In some embodiments, a difference is determined in the difference of the second position of the calibration disc as it leaves the processing chamber and the first position of the calibration disc as it entered processing chamber. This allows for an offset to be applied to the robot arm when placing wafers on the substrate support based on the determined difference. The difference and offset values being determined at operating temperatures results higher accuracy, with an offset from center in the range of less than 50 microns in some embodiments.

In one embodiment, a calibration disc is used to determine a difference between a first position of the center of a calibration disc during placement of the calibration disc at a first substrate support in a processing chamber and a second position of the center of the calibration disc during removal of the calibration disc from the first substrate support. The first position may be determined by one or more sensors positioned between the first substrate support and a second substrate support. An offset to be applied to the robot arm when placing substrates at the first substrate support may be determined based on the difference between the first position and second position so that substrates (e.g., wafers) placed at the first substrate support are placed at the center of the first substrates support.

In one embodiment, the calibration disc is sized to fit through a slit valve of a processing chamber. The calibration disc includes at least three arms that extend approximately radially from the disc-shaped body, with each arm including a chamfered edge that is configured to engage with an edge of a substrate support of the processing chamber. These chamfered edges automatically guide the calibration disc to the center of the substrate support, and are not hindered by thermal expansion of the material of the disc or processing chamber due to the elevated operating temperature. The chamfered edges of the radial arms of the calibration disc adjust the calibration disc from the initial placement to an offset between 1 mm and 3 mm in embodiments. In embodiments, the calibration disc further includes a second chamfered edge that is configured to engage with an edge of a pocket of the substrate support that is shaped to receive substrates. Engagement of the second chamfered edge with the edge of the pocket may function to guide the calibration disc from a first corrected position provided by the chamfered edges of the radial arms to a second target position at the substrate support. This second chamfered edge allows for the calibration disc to become centered on the substrate support and to adjust the placement of the calibration disc by about 20 microns to about 1 mm. In some embodiments, the chamfered edge has a first lead-in that is larger than the lead-in for the second chamfered edge. These features enable automatic repositioning of the calibration disc to center of a substrate support with higher accuracy than conventional systems.

In embodiments, the calibration disc is formed from a solid sintered ceramic article that withstands temperatures exceeding 400 degrees C. without damage or loss of accuracy to the calibration disc. In embodiments, the calibration disc may have channels to reduce interference of sensors in the processing chamber.

FIG. 1 is a top schematic view of an example electronics processing system 100, according to one aspect of the disclosure. Electronics processing system 100 may perform one or more processes on a substrate 102. Substrate 102 may be any suitably rigid, fixed-dimension, planar article, such as, e.g., a silicon-containing disc or wafer, a patterned wafer, a glass plate, or the like, suitable for fabricating electronic devices or circuit components thereon.

Electronics processing system 100 may include a mainframe 104 and a factory interface 106 coupled to mainframe 104. Mainframe 104 may include a housing 108 having a transfer chamber 110 therein. Transfer chamber 110 may include one or more processing chambers (also referred to as process chambers) 114, 116a, 116b, 118a, 118b disposed therearound and coupled thereto. Processing chambers 114, 116a, 116b, 118a, 118b may be coupled to transfer chamber 110 through respective ports 131, which may include slit valves or the like.

Note that an approximately square shaped mainframe having four sides (also referred to as facets) is shown, with multiple processing chambers connected to each facet. However, it should be understood that a facet may include a single processing chamber or more than two processing chambers coupled thereto. Additionally, the mainframe 104 may have other shapes, such as a rectangular shape (in which different facets may have different lengths) or a radial shape with more than four facets (e.g., with five, six, or more facets).

Processing chambers 114, 116a, 116b, 118a, 118b may be adapted to carry out any number of processes on substrates 102. A same or different substrate process may take place in each processing chamber 114, 116a, 116b, 118a, 118b. A substrate process may include atomic layer deposition (ALD), physical vapor deposition (PVD), chemical vapor deposition (CVD), etching, annealing, curing, pre-cleaning, metal or metal oxide removal, or the like. In one example, a PVD process may be performed in one or both of process chambers 114, an etching process may be performed in one or both of process chambers 116a, 116b, and an annealing process may be performed in one or both of process chambers 118a, 118b. Other processes may be carried out on substrates therein. Processing chambers 114, 116a, 116b, 118a, 118b may each include a substrate support assembly. The substrate support assembly may be configured to hold a substrate in place while a substrate process is performed. In some embodiments, one or more processing chambers (e.g., processing chambers 116a, 116b, 118a, 118b may include a single station (e.g., a single substrate support). In some embodiments, one or more processing chambers 114 may include multiple stations (e.g., multiple substrate supports. In some embodiments, processing chamber includes 2, 3, 4 or more substrate supports. In some embodiments, multiple ports couple processing chamber 114 to the transfer chamber.

Transfer chamber 110 may also include a transfer chamber robot 112. Transfer chamber robot 112 may include one or multiple robot arms where each robot arm includes one or more end effectors (also referred to herein as blades) at the end of the robot arm. The end effector may be configured to handle particular objects, such as wafers and/or other substrates. In some embodiments, transfer chamber robot 112 may be a selective compliance assembly robot arm (SCARA) robot, such as a 2 link SCARA robot, a 3 link SCARA robot, a 4 link SCARA robot, and so on. In some embodiments, transfer chamber robot 112 may not be calibrated to substrate supports (also referred to as substrate stations) in one or more of the process chambers 114, 116a-b, 118a-b. Accordingly, in embodiments a calibration process may be performed to calibrate transfer chamber robot 112 to one or more substrate supports of one or more process chambers 114, 116a-b, 118a-b. Once transfer chamber robot 112 is calibrated to a substrate support, transfer chamber robot 112 may accurately place substrates to a center of that substrate support.

In some embodiments, ports 131 and/or slit values are at interfaces between processing chambers 114, 116a, 116b, 118a, 118b and transfer chamber 110. Local center finders (LCFs) 150 may be positioned at or proximate to each such port 131 or slit value. The local center finders 150 are each configured to determine a center of an object (e.g., a ring, wafer, substrate, etc.) passing through the associated port 131 or slit value. LCFs 150 may include an arrangement of laser and detector pairs. Each laser may project a laser beam, which may be received by a corresponding detector in a laser and detector pair. In embodiments, the lasers direct the laser beams vertically or at an angle relative to vertical. Each detector is positioned in the path of a laser beam from a corresponding laser. When an object (e.g., a calibration object such as a calibration disc, a substrate, a wafer, etc.) is passed through the port 131 or slit valve, it blocks the laser beams such that the laser beams are not received by the detectors. Based on known information about a size and shape of the calibration object or other object passing through the port 131 or slit valve, known information about positions of the lasers and detectors, and known information about respective positions of the transfer chamber robot 112 at which each of the respective detectors stopped receiving a laser beam, a center of the calibration object or other known object may be determined. Other types of LCFs may also be used, such as camera-based local center finders and/or runout ribbon-based local center finders. Such information may be used in embodiments to perform calibration of the transfer chamber robot 112 to substrate supports in chambers 114, 116a, 116b, 118a, 118b.

One or more load locks 120a, 120b may also be coupled to housing 108 and transfer chamber 110. Load locks 120a, 120b may be configured to interface with, and be coupled to, transfer chamber 110 on one side and factory interface 106 on another side. Load locks 120a, 120b may have an environmentally-controlled atmosphere that may be changed from a vacuum environment (wherein substrates may be transferred to and from transfer chamber 110) to an at or near atmospheric-pressure (e.g., with inert-gas) environment (wherein substrates may be transferred to and from factory interface 106) in some embodiments. In some embodiments, one or more load locks 120a, 120b may be a stacked load lock having one or more upper interior chambers and one or more lower interior chambers that are located at different vertical levels (e.g., one above another). In some embodiments, a pair of upper interior chambers are configured to receive processed substrates from transfer chamber 110 for removal from mainframe 104, while a pair of lower interior chambers are configured to receive substrates from factory interface 106 for processing in mainframe 104. In some embodiments, one or more load locks 120a, 120b may be configured to perform a substrate process (e.g., an etch or a pre-clean) on one or more substrates 102 received therein.

In embodiments, ports 133 and/or slit valves separate the transfer chamber 110 from the load locks 120a, 120b. LCFs 152 are positioned at or proximate to each such port 133 and/or slit value. The LCFs may be used to determine a center of objects (e.g., calibration objects, wafers, substrates, etc.) on robot arm 112 while such objects are placed in the load lock or removed from the load lock by the robot arm 112.

Factory interface (FI) 106 may be any suitable enclosure, such as, e.g., an Equipment Front End Module (EFEM). Factory interface 106 may be configured to receive substrates 102 from substrate carriers 122 (e.g., Front Opening Unified Pods (FOUPs)) docked at various load ports 124 of factory interface 106. A factory interface robot 126 (shown dotted) may be configured to transfer substrates 102 between substrate carriers (also referred to as containers) 122 and load lock 120. Factory interface robot 126 may include one or more robot arms and may be or include a SCARA robot. In some embodiments, factory interface robot 126 may have more links and/or more degrees of freedom than transfer chamber robot 112. Factory interface robot 126 may include an end effector on an end of each robot arm. The end effector may be configured to pick up and handle specific objects, such as wafers. Alternatively, or additionally, the end effector may be configured to handle objects such as calibration discs or other calibration objects.

Any conventional robot type may be used for factory interface robot 126. Transfers may be carried out in any order or direction. Factory interface 106 may be maintained in, e.g., a slightly positive-pressure non-reactive gas environment (using, e.g., nitrogen as the non-reactive gas) in some embodiments.

In some embodiments, a side storage pod (SSP, not shown) is coupled to the FI 106.

The substrate carriers 122 as well as load ports 124, substrate carriers 122, load locks 120a, 120b, SSPs, and processing chambers 114, 116a, 116b, 118a, 118b are each considered to be or include substrate supports herein. In some embodiments, transfer chamber 110, process chambers 114, 116a, 116b, and 118a, 118b, and load lock 120 may be maintained at a vacuum level. Electronics processing system 100 may include one or more ports 130, 131, 133 (e.g., vacuum ports) that are coupled to one or more stations of electronics processing system 100. For example, ports 130 (e.g., vacuum ports) may couple factory interface 106 to load locks 120. Additional ports 133 (e.g., vacuum ports) may be coupled to load locks 120 and disposed between load locks 120 and transfer chamber 110, as discussed above. Each of the ports 130, 133, 131 may include slit valves that separate a vacuum environment from a higher pressure (e.g., atmospheric pressure) environment.

Electronics processing system 100 may also include a system controller 132. System controller 132 may be and/or include a computing device such as a personal computer, a server computer, a programmable logic controller (PLC), a microcontroller, and so on. System controller 132 may include one or more processing devices, which may be general-purpose processing devices such as a microprocessor, central processing unit, or the like. More particularly, the processing device may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device may also be one or more special-purpose processing devices such as an application specific integrated circuit (ASIC), a field programmable gate array (FPGA), a digital signal processor (DSP), network processor, or the like. System controller 132 may include a data storage device (e.g., one or more disk drives and/or solid state drives), a main memory, a static memory, a network interface, and/or other components. System controller 132 may execute instructions to perform any one or more of the methodologies and/or embodiments described herein. The instructions may be stored on a computer readable storage medium, which may include the main memory, static memory, secondary storage and/or processing device (during execution of the instructions). System controller 132 may also be configured to permit entry and display of data, operating commands, and the like by a human operator.

In some embodiments, system controller 132 causes electronics processing system 100 to perform one or more calibration procedures to generate calibration data (e.g., characteristic error values) associated with one or more stations (e.g., substrate supports), one or more robots and/or one or more wafer transfer sequences. System controller 132 stores the calibration values (e.g., characteristic error values) in one or more data storage devices.

FIG. 1 schematically illustrates transfer of a calibration disc 136 into a processing chamber 114, 116a, 116b, 118a, 118b.

According to one aspect of the disclosure, a calibration disc 136 is removed from a substrate carrier 122 (e.g., a FOUP) or SSP via factory interface robot 126 located in the factory interface 106, or alternatively, is loaded directly into the factory interface 106. In some embodiments, system controller 132 determines a transfer recipe for the calibration disc 136. The transfer recipe may indicate a transfer path that the calibration disc 136 is to follow while being transported from substrate carrier 122 or SSP to a particular processing chamber 114, 116a, 116b, 118a, 118b.

The calibration disc 136 may include a flat surface or a notch that is to be aligned with a corresponding flat in a substrate support assembly around which the calibration disc 136 is to be placed in a processing chamber. Alternatively, the calibration disc 136 may not include a flat or a notch, and orientation of the calibration disc 136 may not be considered. In an ideal setup, with no robot position and/or rotation error, no misadjustment of a processing chamber relative to the transfer chamber, etc., calibration disc 136 will be centered on a substrate support when placed on the substrate support by robot 112. However, different robot errors may occur for placement of calibration disc 136 in each of the processing chambers. Additionally, one or more of the processing chambers may have a slight misalignment or misadjustment. Embodiments described herein provide a calibration procedure that corrects for any such robot errors, misalignments and/or misadjustments, as is described more fully below.

Transfer chamber robot 112 may remove the calibration disc 136 from load lock 120b through second vacuum port 130b. Transfer chamber robot 112 may move the calibration disc 136 into the transfer chamber 110, where the object may be transferred to a destination station (e.g., a substrate support of processing chamber 114, 116a, 116b, 118a, 118b). An LCF associated with the processing chamber 114, 116a, 116b, 118a, 118b may measure a center of the calibration disc 136 as the calibration disc is inserted into the process chamber. The calibration disc 136 may be placed in the destination station (e.g., substrate support of processing chamber 114, 116a, 116b, 118a, 118b).

In embodiments, when the transfer chamber robot 112 places the calibration disc 136 on a substrate support of a process chamber 114, 116a, 116b, 118a, 118b, the transfer chamber robot 112 nominally places the calibration disc 136 at a first target location on the substrate support using a taught position of a robot arm of the transfer chamber robot 112. The first target location may be at a center of the substrate support, or may be at a location that is offset from the center of the substrate support. The calibration disc 136 may have one or more physical features (e.g., kinematic couplings) that cause the calibration disc 136 to become centered on the substrate support even if it was not originally placed at the center of the substrate support. The robot 112 may retrieve the calibration disc 136 from the calibration support, and an LCF 150 may measure a center of the calibration disc as it is removed from the process chamber. In embodiments, the system controller 132 receives the first measurement of the center of the calibration disc that was measured when the calibration disc 136 was inserted into the process chamber and the second measurement of the center of the calibration disc that was measured when the calibration disc was removed from the process chamber. The system controller 132 may then compute an offset between the first measurement and the second measurement, and may use the computed offset to update a taught position for the robot 112 to place substrates in the process chamber. The new taught position for the robot 112 may cause substrates to be placed at the center of the substrate support for the process chamber. This process may be performed for each process chamber and/or each substrate support to calibrate the robot 112 to the substrate supports of each of the process chambers and/or substrate supports.

Calibration of the transfer chamber robot 112 taught positions for transfer of substrates to process chambers is discussed in greater detail below with reference to FIG. 6.

Figure 2:
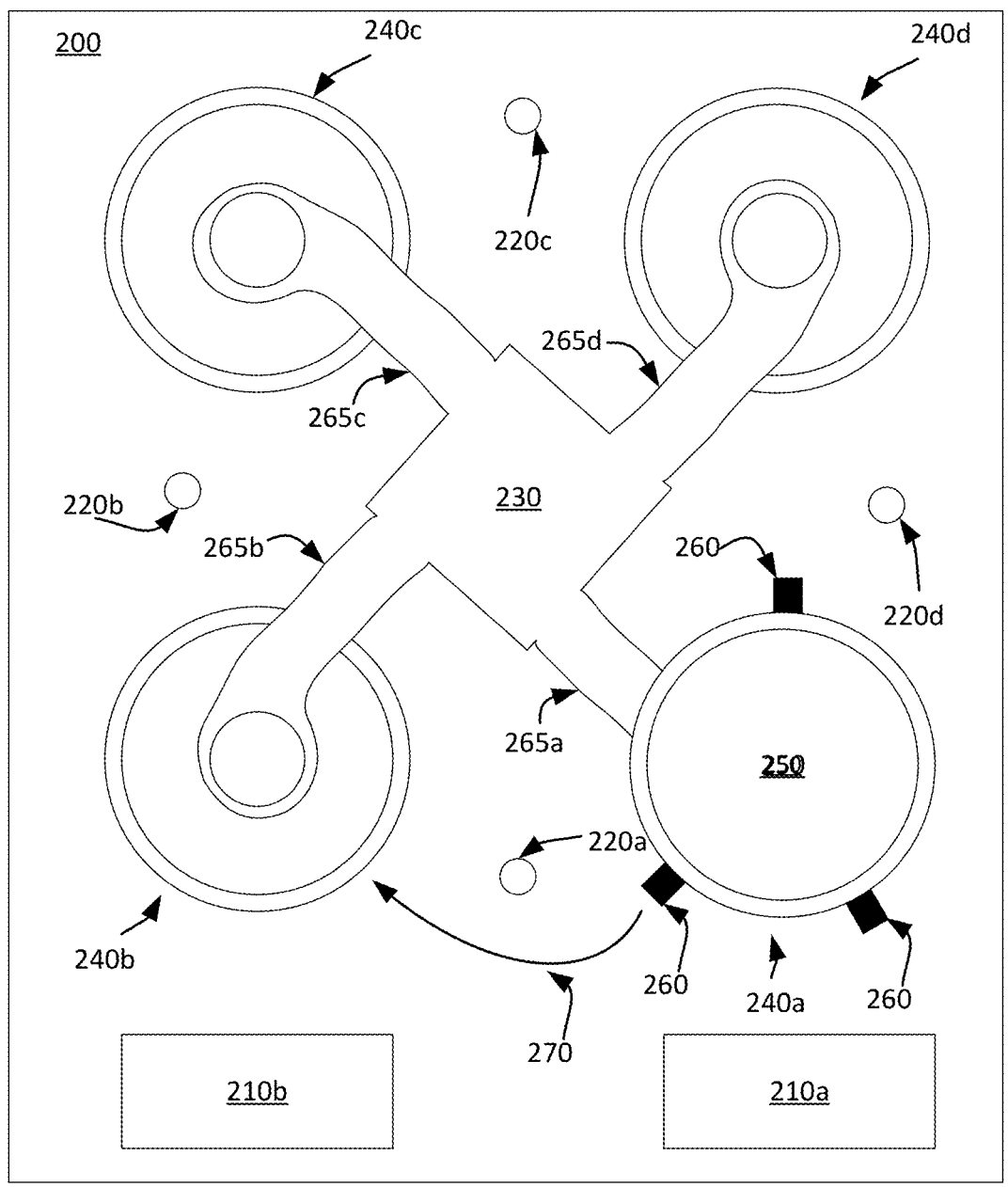
FIG. 2 is a top schematic view of an example processing chamber, according to aspects of the present disclosure.

FIG. 2 illustrates an example of a processing chamber 200 with four substrate stations 240a-d. Alternatively, processing chamber 200 may include greater or fewer substrate stations. One or more processes may be performed on substrates at each of the substrate stations 240a-d. In embodiments, the same or different operations may be performed at each substrate station 240a-d. The processing chamber 200 may correspond to processing chamber 114 of FIG. 1 in some embodiments.

In some embodiments, one or more substrate stations 240a-d of processing chamber 200 may be accessible to a transfer chamber robot 230 via one or more ports of the processing chamber 200. A first position of the center of a calibration disc 250 may be determined when the calibration disc is inserted into the processing chamber 200 by one or more sensors 210a-b (e.g., an of an LCF) positioned at a port of the processing chamber 200.

In embodiments, the calibration disc 250 may include arms that extend from the center of the disc that include chamfered edges 260. When the chamfered edges 260 of the calibration disc 250 interact with the substrate support 240, the position of the chamfered edges 260 that comprise the calibration disc 250 cause the calibration disc 250 to move in the x direction and y direction on the surface of the substrate support 240 such that the calibration disc moves to the center of the substrate support 240.

The calibration disc 250 may then be removed from the substrate support station 240 using the transfer chamber robot arm. A second position is then determined for the calibration disc 250 when it is removed from the processing chamber 200. A difference may be determined between the first position of the calibration disc 250 and the second position of the calibration disc 250 and an offset may be determined to apply to the robot arm 230 when placing wafers onto the substrate support 240 based on the determined difference.

In some embodiments, the processing chamber 200 may include a process chamber robot 230 with one or multiple arms 265a-d (e.g., four arms) with an orientation configured to move objects (e.g. calibration discs, wafers, etc.) between substrate support stations 240 within the processing chamber 200. In some embodiments, the robot 230 may rotate to move substrates between substrate stations 240a-d. In some embodiments, one or more robot arms 265a-d of the robot 230 may not be calibrated to one or more of the substrate stations 240a-d. Accordingly, a calibration process may be performed to calibrate the robot 230 (or one or more arms 265a-d of the robot 230) to the substrate stations 240a-d.

In addition to, or instead of, calibrating a transfer chamber robot arm to substrate station positions, a process chamber robot 230 (or one or more arms 265a-d of the process chamber robot 230) may be calibrated to one or more substrate stations 240a-d of the processing chamber 200 using a similar technique to that described with reference to the calibration of the transfer chamber robot to a substrate station 240a-d.

In some embodiments, a calibration disc 250 is retrieved by the process chamber robot 230 from an initial support station (e.g., support station 240a) at which the calibration disc 250 was previously placed. The calibration disc 250 may be transferred to a second substrate station (e.g., substrate station 240b) within the processing chamber 200 using the process chamber robot 230. A first position of the calibration disc 250 may be determined using one or more sensors 220 (e.g., of an LCF) positioned between the first substrate support 240a and the second substrate support 240b as the calibration disc 250 is transferred 270 between the first substrate support 240a and the second substrate support 240b. The calibration disc 250 is then placed onto the second substrate support 240b and the chamfered edges 260 of the calibration disc 250 may interact with the substrate support 240b to cause the calibration disc 250 to move in the x direction and y direction on the surface of the substrate support 240b such that the calibration disc moves to the center of the substrate station 240b.

The calibration disc 250 is then retrieved by the mainframe robot 230 and is transferred to either the first substrate station 240a or to a third substrate station 240c. If the calibration disc 250 is moved back to the first substrate station 240a, then the one or more sensors 220a (e.g., LCF) between those two substrate stations may be used to again determine a new center of the calibration disc 250. If the calibration disc 2650 is moved to the third substrate station 240c, then sensors 220b (e.g., of another LCF) between the second and third substrate stations determine the new center of the calibration disc 250. A difference is then determined between the first position of the center of the calibration disc and the second or new position of the center of the calibration disc. This difference is then applied as an offset to the process chamber robot 230 when placing wafers onto the second substrate support 240b. A similar process may be performed to determine offsets to apply to arms 265a-d of robot 230 when placing substrates at each of the other substrate stations 240c, 240d, 240a.

Figure 3A:
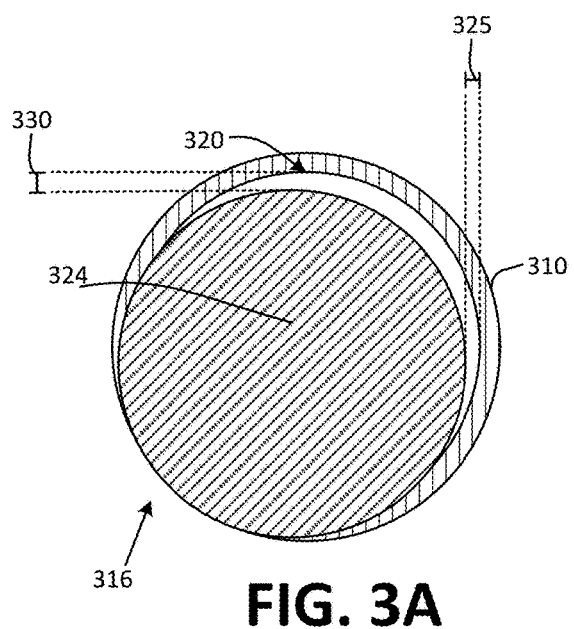
FIGS. 3A and 3B illustrate an example first orientation and an example initial target orientation of a calibration disc on a substrate support of a processing chamber, according to aspects of the present disclosure.

FIG. 3A illustrates an example first position 316 of a calibration disc 324 at substrate support of a processing chamber, according to aspects of the present disclosure. The processing chamber may correspond to at least one of processing chamber 114, 116a, 116b, or 118a, 118b of electronics processing system 100 illustrated in FIG. 1. In some embodiments, the processing chamber may include a substrate support 310 configured to support a substrate during a substrate process. Calibration disc 324 may be configured for placement on the substrate support assembly 310. As discussed previously, calibration disc 324 may be placed by a transfer chamber robot (not shown) or a process chambre robot at a first position 316 at substrate support 310. In some embodiments, first position 316 may include positional error. Positional error may include a first positional error 325 along an x-axis and/or a second positional error 330 along a y-axis. The positional error may indicate a difference between an actual position and a target position of the calibration disc 310 (e.g., where the calibration disc 324 may be centered when at the target position). The first positional error 325 may be caused by a first characteristic error value in the y-direction and the second positional error 330 may be associated with a second characteristic error value in the x-direction. The characteristic errors may result from a variety of sources (e.g., error in robot angle and/or positioning, the processing chamber not being installed properly during construction of the processing system, etc.).

Figure 3B:
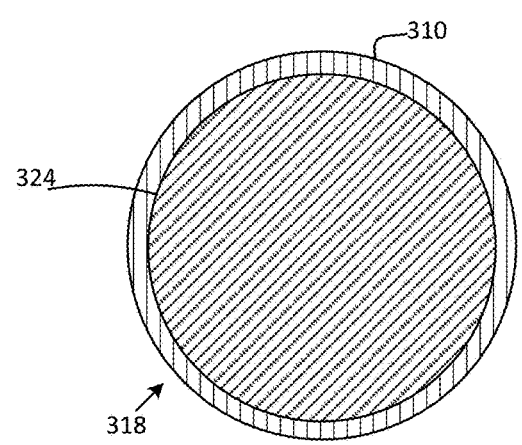

FIG. 3B illustrates an example position 318 of the calibration disc 324 at the processing chamber, according to aspects of the present disclosure. The position 318 may be a correct orientation and position for placement of the calibration disc 310 at the substrate support 310. In some embodiments, position 318 in the processing chamber may be automatically achieved by calibration features of the calibration disc 324 that cause it to automatically become centered on the substrate support 310.

Figure 4A:
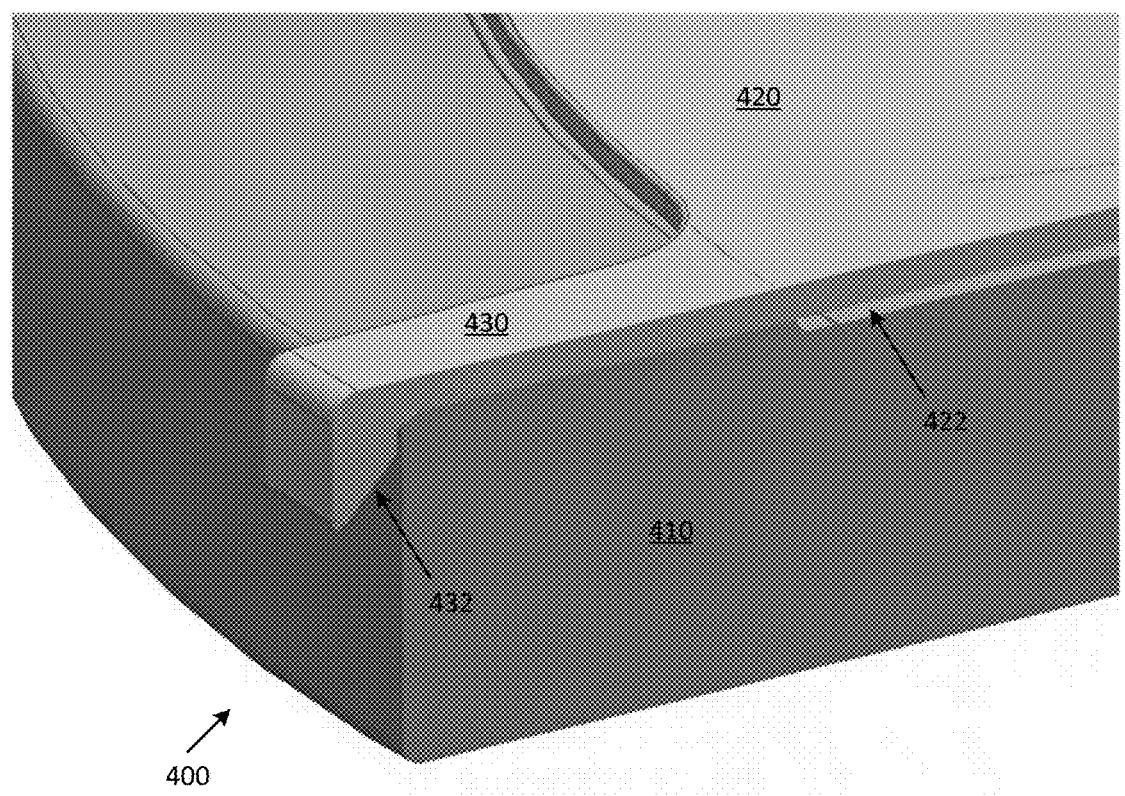
FIG. 4A illustrates a portion of an example calibration disc seated on a substrate support, according to aspects of the present disclosure.

FIG. 4A illustrates an example calibration disc 420 on a substrate support 410 of a station, according to aspects of the present disclosure. Calibration disc 420 includes a ceramic disc-shaped body, with three or more arms 430. The arms 430 include chamfered edges 432 that cause the calibration disc to become centered on the substrate support 410. In embodiments, the chamfered edges 432 of the calibration disc may include an approximately 45-degree slope. In other embodiments, different slopes may be used for the chambered edges, such as 30 degrees, 15 degrees, 60 degrees, 85 degrees, and/or any other angle or slope.

Figure 4B:
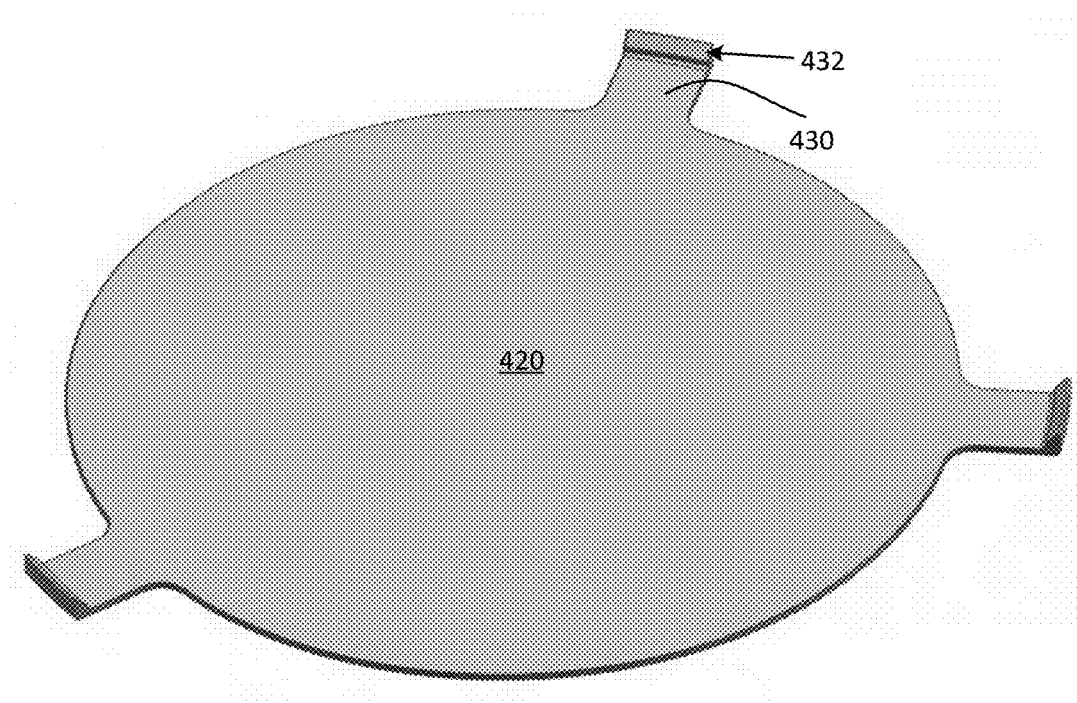
FIG. 4B illustrates an example calibration disc, according to aspects of the present disclosure.

FIG. 4B illustrates surface of a bottom of the calibration disc 420. In embodiments, the calibration disc 420 may include at least three arms 430 that extend radially from the disc-shaped body. Each arm of the at least three arms 430 may include a chamfered edge 432 configured to engage with an edge of a substrate support 410. The chamfered edge 432 of the at least three arms 430 may be configured to guide the calibration disc to a first target position at the substrate support 410. The disc-shaped body may further include a second chamfered edge to engage with an edge of a pocket 422 of the substrate support 410 to guide the calibration disc 420 from the first target position to a second target position at the substrate support at which the calibration disc 420 is centered on the substrate support 410. In some embodiments, the second edge may not be chamfered. In embodiments, the calibration disc 420 may include a shape that is a negative of a second shape of a surface of the substrate support 410 (e.g., of the pocket 422).

In embodiments, the chamfered edge 432 of the calibration disc 420 may include a first lead-in and the second chamfered edge (not shown) may include a second lead-in that is smaller than the first lead-in. The disc-shaped body of the calibration disc 420 and the at least three arms 430 may be part of a solid sintered ceramic article that is usable at temperatures of up to approximately 400 degrees C. without damage to the calibration disc 420.

In some embodiments, the calibration disc 420 may be configured to thermally expand at an operating temperature of the processing chamber. The calibration disc 420 may further be configured to be used for calibration of a processing chamber at the operating temperature.

Figure 5A:
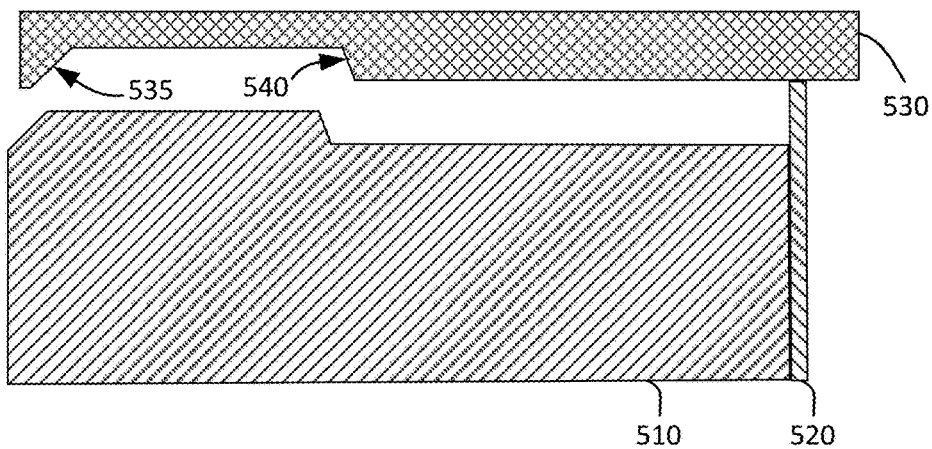
FIGS. 5A-5C illustrate placement of an example calibration disc at a substrate support station, according to aspects of the present disclosure.
Figure 5B:
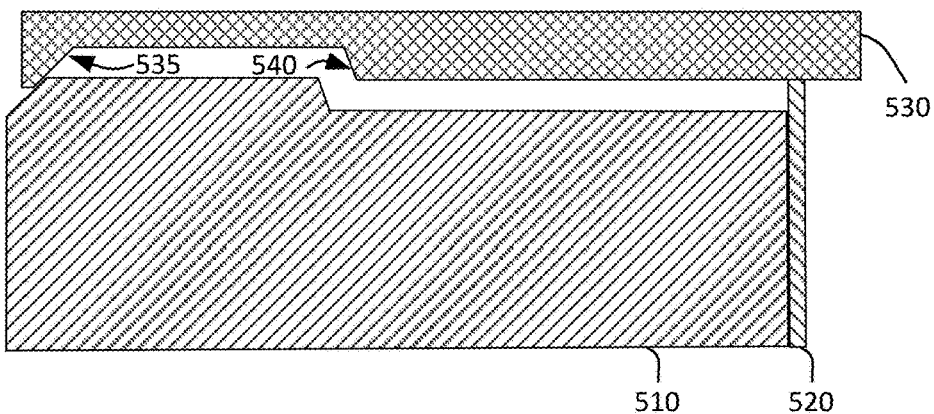
Figure 5C:
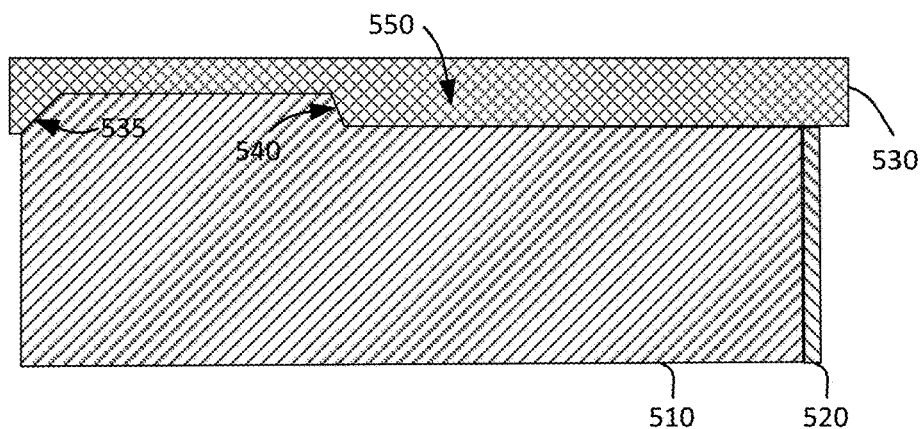

FIGS. 5A-5C illustrate placement of example calibration disc 530 onto a substrate support 510, according to aspects of the present disclosure. In FIG. 5A, a plurality of lift pins 520 (only one lift pin is illustrated in the figure) are extended and engage with the calibration disc 530. In FIG. 5B, the lift pins 520 are lowered, and first features 535 (e.g., a first chamfered edge) of one of the at least three arms is used to correct a positional error of the calibration disc 530 as it engages with an outer edge of the substrate support 510. The first features 535 may be kinematic coupling interfaces in some embodiments. The first features 535 on the arms may correct for gross errors in some embodiments. In some embodiments, the outer edge of the substrate support 510 is chamfered (e.g., with a similar slope as the first feature 535). In some embodiments, the outer edge of the substrate support 510 is not chamfered.

FIG. 5C illustrates the interface between the calibration disc 530 and the substrate support 510 when the lift pins 520 have fully lowered the calibration disc 530 and second features 540 of the calibration disc 530 have acted on the substrate support 510 to center the calibration disc 530. The second features 540 may include second chamfered edges of the body of the calibration disc in embodiments. The second features 540 may correct for fine errors of centering of the calibration disc 530 on the substrate support 510 in an embodiment. In some embodiments, the second features 540 engage with an edge of a pocket 550 of the substrate support 510 that is configured to receive substrates such as wafers. The calibration disc 530 may have a shape that is a negative of a second shape of the surface of the substrate support 510 in some embodiments. In some embodiments, the edge of the pocket 550 of the substrate support 510 is chamfered (e.g., with a similar slope as the first feature 540). In some embodiments, the edge of the pocket 550 of the substrate support 510 is not chamfered or has a different slope or angle than a chamfer of the second features 540.

Figure 6:
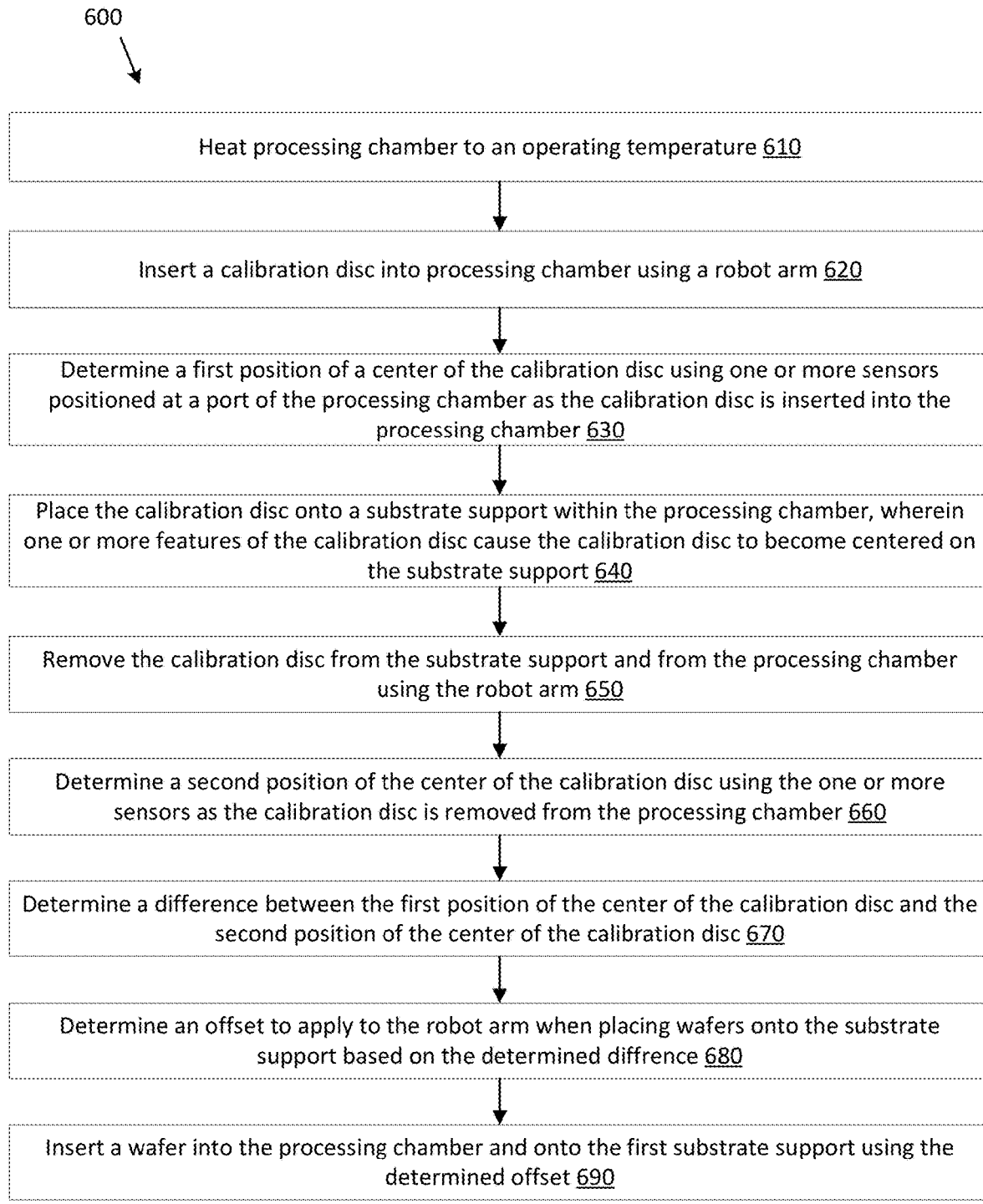
FIG. 6 is flow chart for a method of calibrating placement of a substrate at a substrate support of a processing chamber, according to embodiments of the present disclosure.
Figure 7:
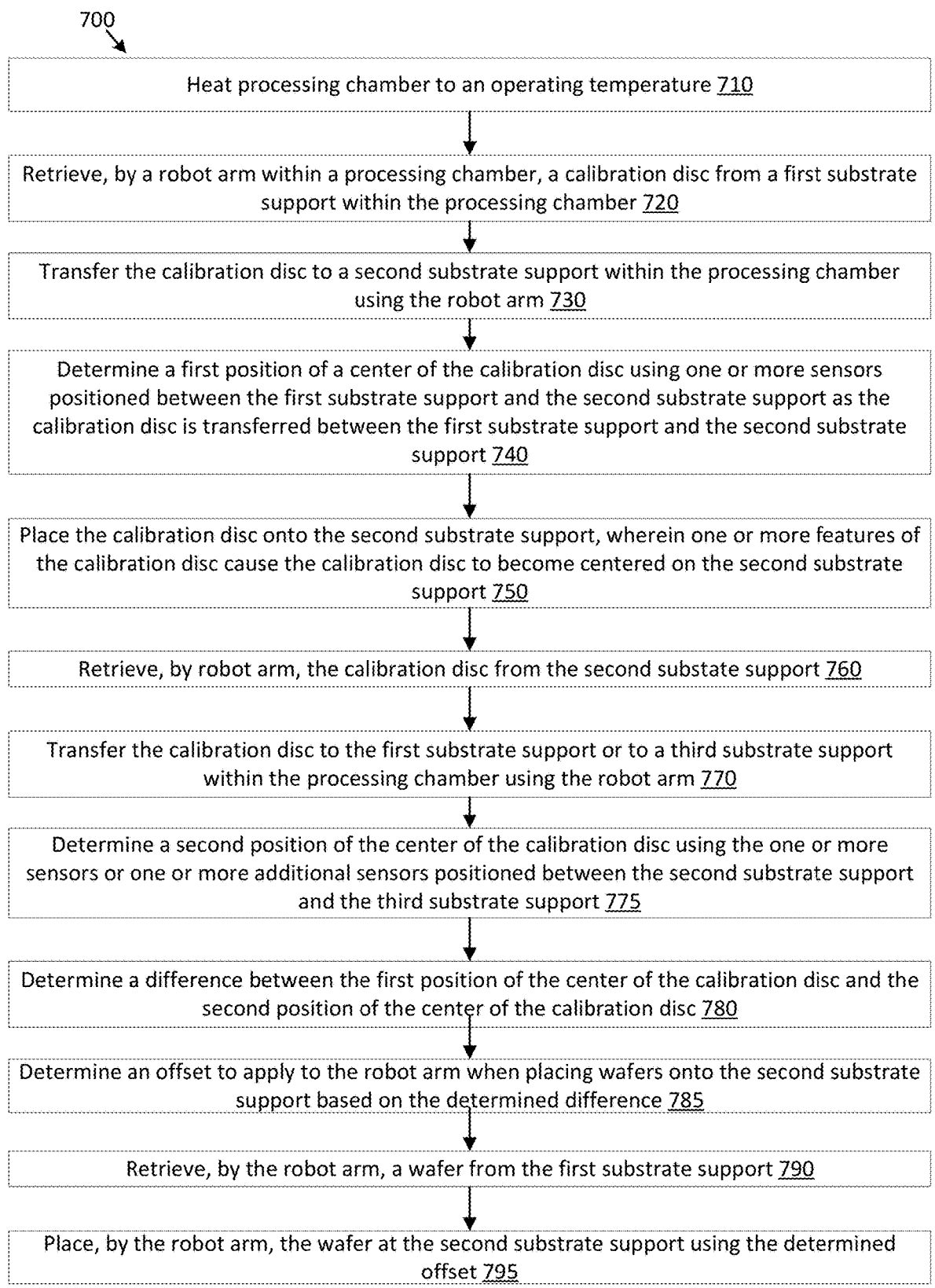
FIG. 7 is flow chart for a method of calibrating a transfer sequence of a calibration disc between a first station in a processing chamber and a second station in the processing chamber, according to embodiments of the present disclosure.

FIGS. 6 and 7 are flow diagrams of various embodiments of methods 600-700 for calibrating components and/or a transfer sequence of an electronics processing system and/or for transferring objects between components of the electronics processing system using characteristic error values determined from calibration. The methods are performed by processing logic that may include hardware (circuitry, dedicated logic, etc.), software (such as is run on a general-purpose computer system or a dedicated machine), firmware, or some combination thereof. Some operations of methods 600-700 may be performed by or initiated by a computing device, such as system controller 132 of FIG. 1.

For simplicity of explanation, the methods are depicted and described as a series of acts. However, acts in accordance with this disclosure can occur in various orders and/or concurrently, and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events.

FIG. 6 is a flow chart of a method 600 for calibrating a transfer sequence between a transfer chamber robot and a substrate support of a processing chamber, according to embodiments of the present disclosure. At block 610, a heater heats the processing chamber to an operating temperature. In embodiments, the operating temperature may include a range up to 400 degrees C., up to 600 degrees C., or another elevated temperature that is elevated above room temperature. At block 620, a calibration disc is retrieved, by a first robot arm of a transfer chamber, and is inserted into a processing chamber. At block 630, a first position is determined of the center of the calibration disc using one or more sensors positioned at a port of the processing chamber as the calibration disc is inserted into the processing chamber.

At block 640, the calibration disc is placed onto a substrate support within the processing chamber. In response to placement onto a substrate support, one or more features of the calibration disc cause the calibration disc to become centered on the substrate support. In embodiments, the features may include a first chamfered edge of the one of at least three arms of the calibration disc, and a second chamfered edge configured to engage with pocket of the substrate support. At block 650, the calibration disc is removed from the substrate support and from the processing chamber using the robot arm.

At block 660, a second position is determined of the center of the calibration disc using the one or more sensors as the calibration disc is removed from the processing chamber. At block 670, a difference is determined between the first position of the center of the calibration disc and the second position of the center of the calibration disc.

At block 680, an offset is determined to apply to the robot arm when placing wafers onto the substrate support based on the determined difference. At block 690, a wafer may be inserted into the processing chamber and onto the first substrate support using the determined offset.

FIG. 7 is a flow chart for a method 700 of calibrating a transfer sequence between a plurality of substrate supports within a processing chamber of an electronics processing system, according to embodiments of the present disclosure. At block 710, a heater heats the processing chamber to an operating temperature. In embodiments, the operating temperature may include a range up to 400 degrees C., or another elevated temperature. At block 720 of method 700, a robot arm within a process chamber retrieves a calibration disc from a first substrate support within the processing chamber.

At block 730, the calibration disc is transferred to a second substrate support within the processing chamber using the robot arm. At block 740, a first position is determined of a center of the calibration disc using one or more sensors positioned between the first substrate support and the second substrate support as the calibration disc is transferred between the first substrate support and the second substrate support.

At block 750, the calibration disc is placed onto the second substrate support. In response to placement onto the second substrate support one or more features of the calibration disc cause the calibration disc to become centered on the second substrate support. At block 760, the calibration disc is retrieved from the second substrate support by the robot arm. At block 770, the calibration disc is transferred to the first substrate support or to a third substrate support within the processing chamber using the robot arm.

At block 775, a second position of the center of the calibration disc is determined using the one or more sensors or one or more additional sensors positioned between the second substrate support and the third substrate support. At block 780, a difference is determined between the first position of the center of the calibration disc and the second position of the center of the calibration disc. At block 785, an offset is determined to apply to the robot arm when placing wafers onto the second substrate support based on the determined difference. At block 790, a wafer is retrieved by the robot arm from the first substrate support. At block 795, the wafer may be placed, by the robot arm, at the second substrate support using the determined offset. Method 700 may be repeated for one or more additional substrate supports of a processing chamber until a process chamber robot has been properly calibrated to all substrate supports of the processing chamber.

Figure 8:
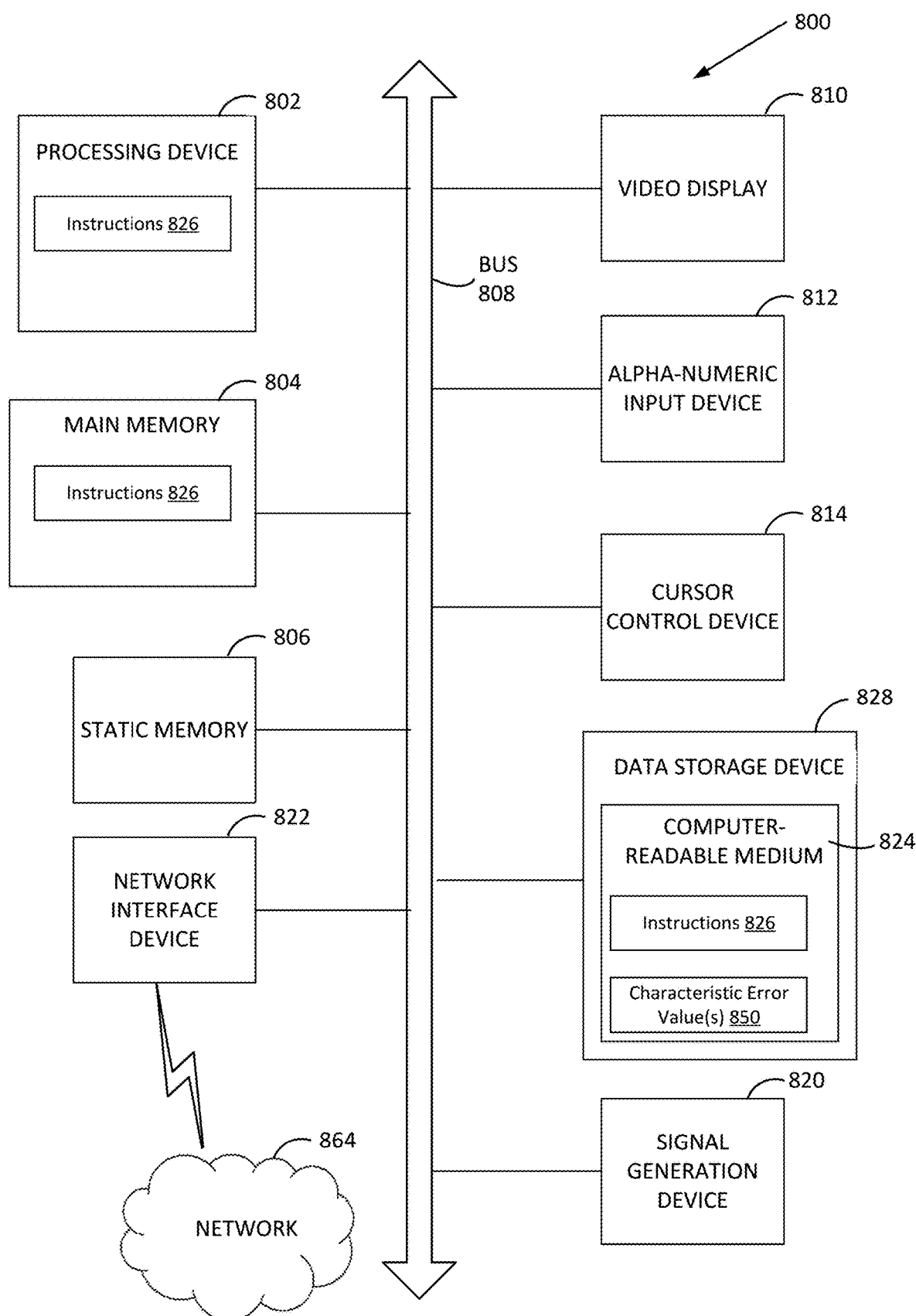
FIG. 8 is a block diagram illustrating a computer system, according to certain embodiments.

FIG. 8 is an example computing device 800 that may operate as a system controller for an electronics processing system, in accordance with embodiments of the present disclosure. The computing device 800 is a machine within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein. In an embodiment, computing device 800 corresponds to system controller 132 of FIG. 1. In one embodiment, system controller 132 is a component of computing device 800.

The example computing device 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory (e.g., a data storage device 812), which communicate with each other via a bus 808.

Processing device 802 represents one or more general-purpose processors such as a microprocessor, central processing unit, or the like. More particularly, the processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. Processing device 802 is configured to execute the processing logic (instructions 822) for performing the operations discussed herein. In one embodiment, system controller 132 corresponds to processing device 802. In embodiments, processing device 802 executes instructions 826 to implement any of methods 600-700 in embodiments.

The computing device 800 may further include a network interface device 808. The computing device 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 816 (e.g., a speaker).

The data storage device 818 may include a machine-readable storage medium (or more specifically a computer-readable storage medium) 828 on which is stored one or more sets of instructions 822 embodying any one or more of the methodologies or functions described herein. The instructions 822 may also reside, completely or at least partially, within the main memory 804 and/or within the processing device 802 during execution thereof by the computer system 800, the main memory 804 and the processing device 802 also constituting computer-readable storage media.

The computer-readable storage medium 828 may also be used to store instructions 826 and/or characteristic error values (e.g., offsets to use for placement of substrates at substrate supports in process chambers) 850 as discussed herein above. While the computer-readable storage medium 828 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium other than a carrier wave that is capable of storing or encoding a set of instructions for execution by the machine and that cause the machine to perform any one or more of the methodologies described herein. The term "computer-readable storage medium" shall accordingly be taken to include, but not be limited to, the non-transitory media including solid-state memories, and optical and magnetic media.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of operations of each method may be altered so that certain operations may be performed in an inverse order so that certain operations may be performed, at least in part, concurrently with other operations. In another embodiment, instructions or sub-operations of distinct operations may be in an intermittent and/or alternating manner.

The preceding description sets forth numerous specific details such as examples of specific systems, components, methods, and so forth in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

It is understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    inserting a calibration disc into a processing chamber using a robot arm;
    determining a first position of a center of the calibration disc using one or more sensors positioned at a port of the processing chamber as the calibration disc is inserted into the processing chamber;
    placing the calibration disc onto a substrate support within the processing chamber, wherein one or more features of the calibration disc cause the calibration disc to become centered on the substrate support;
    removing the calibration disc from the substrate support and from the processing chamber using the robot arm;
    determining a second position of the center of the calibration disc using the one or more sensors as the calibration disc is removed from the processing chamber;
    determining a difference between the first position of the center of the calibration disc and the second position of the center of the calibration disc; and
    determining an offset to apply to the robot arm when placing wafers onto the substrate support based on the determined difference.

2. The method of claim 1, wherein the calibration disc is not initially placed at a center of the substrate support, and wherein the one or more features comprise a first plurality of chamfered edges that at least partially align the center of the calibration disc with the center of the substrate support.

3. The method of claim 2, wherein the one or more features further comprise a second plurality of chamfered edges that fully align the center of the calibration disc with the center of the substrate support.

4. The method of claim 1, further comprising:
    heating the processing chamber to an operating temperature prior to insertion of the calibration disc into the processing chamber, wherein the calibration disc thermally expands within the processing chamber, and wherein one or more features of the calibration disc cause the calibration disc to become centered on the substrate support at the operating temperature.

5. The method of claim 4, wherein the operating temperature is between about 20 degrees C. and about 500 degrees C.

6. The method of claim 1, wherein the one or more sensors comprise a plurality of laser emitters to emit a plurality of light beams and a plurality of receivers to receive the plurality of light beams, wherein a controller is to determine the first position of the center of the calibration disc based on one or more positions of the robotic arm and readings indicating receivers of the plurality of receivers detecting a light beam of the plurality of light beams and receivers of the plurality of receivers not detecting any light beam of the plurality of light beams for the one or more positions of the robotic arm.

7. The method of claim 1, further comprising:
inserting a wafer into the processing chamber and onto the substrate support using the determined offset.

8. A method comprising:
retrieving, by a robot arm within a processing chamber, a calibration disc from a first substrate support within the processing chamber;
transferring the calibration disc to a second substrate support within the processing chamber using the robot arm;
determining a first position of a center of the calibration disc using one or more sensors positioned between the first substrate support and the second substrate support as the calibration disc is transferred between the first substrate support and the second substrate support;
placing the calibration disc onto the second substrate support, wherein one or more features of the calibration disc cause the calibration disc to become centered on the second substrate support;
retrieving, by a robot arm, the calibration disc from the second substrate support;
transferring the calibration disc to the first substrate support or to a third substrate support within the processing chamber using the robot arm;
determining a second position of the center of the calibration disc using the one or more sensors or one or more additional sensors positioned between the second substrate support and the third substrate support;
determining a difference between the first position of the center of the calibration disc and the second position of the center of the calibration disc; and
determining an offset to apply to the robot arm when placing wafers onto the second substrate support based on the determined difference.

9. The method of claim 8, further comprising:
retrieving, by the robot arm, a wafer from the first substrate support; and
placing, by the robot arm, the wafer at the second substrate support using the determined offset.

10. The method of claim 8, wherein the calibration disc is not initially placed at a center of the first substrate support, and wherein the one or more features comprise a first plurality of chamfered edges that at least partially align the center of the calibration disc with the center of the first substrate support.

11. The method of claim 10, wherein the one or more features further comprise a second plurality of chamfered edges that fully align the center of the calibration disc with the center of the substrate support.

12. The method of claim 8, further comprising:
heating the processing chamber to an operating temperature, wherein the calibration disc thermally expands within the processing chamber, and wherein one or more features of the calibration disc cause the calibration disc to become centered on the second substrate support at the operating temperature.

13. The method of claim 12, wherein the operating temperature is between about 20 degrees C. and about 500 degrees C.

14. The method of claim 8, wherein the calibration disc was transferred to the third substrate support, the method further comprising:
retrieving, by the robot arm, the calibration disc from the third substrate support;
transferring the calibration disc to a fourth substrate support within the processing chamber using the robot arm;
determining a third position of the center of the calibration disc using one or more further sensors positioned between the third substrate support and the fourth substrate support;
determining a second difference between the second position of the center of the calibration disc and the third position of the center of the calibration disc; and
determining a second offset to apply to the robot arm when placing wafers onto the third substrate support based on the second difference.

15. A calibration disc, comprising:
a disc-shaped body sized to fit through a slit valve of a processing chamber; and
at least three arms extending approximately radially from the disc-shaped body, each arm of the at least three arms comprising a chamfered edge configured to engage with an edge of a substrate support of the processing chamber and to guide the calibration disc to a first target position at the substrate support;
wherein the disc-shaped body further comprises a second chamfered edge configured to engage with an edge of a pocket of the substrate support and to guide the calibration disc from the first target position to a second target position at the substrate support at which the calibration disc is centered on the substrate support.

16. The calibration disc of claim 15, wherein the chamfered edge has a first lead-in, and wherein the second chamfered edge has a second lead-in that is smaller than the first lead-in.

17. The calibration disc of claim 15, wherein the disc-shaped body and the three arms are parts of a solid sintered ceramic article that is usable at temperatures of up to approximately 400 degrees C. without damage to the calibration disc.

18. The calibration disc of claim 15, wherein the calibration disc is configured to thermally expand at an operating temperature of the processing chamber, and wherein the calibration disc is configured to be used for calibration of processing chamber at the operating temperature.

19. The calibration disc of claim 15, wherein the chamfered edges of the calibration disc comprise an approximately 45-degree slope.

* * * * *